(12) United States Patent
Hurst et al.

(10) Patent No.: US 7,931,446 B2
(45) Date of Patent: Apr. 26, 2011

(54) TREATMENT OF TURBINE BLADES TO INCREASE HARDNESS

(75) Inventors: William D. Hurst, Ft. Pierce, FL (US); Glenn E. Cauthren, Palm City, FL (US)

(73) Assignee: X-Treme Aerospace Inc., Ft. Pierce, FL (US)

( * ) Notice: Subject to any disclaimer, the term of this patent is extended or adjusted under 35 U.S.C. 154(b) by 863 days.

(21) Appl. No.: 11/674,922

(22) Filed: Feb. 14, 2007

(65) Prior Publication Data
US 2008/0193298 A1    Aug. 14, 2008

(51) Int. Cl.
*F01D 5/14*    (2006.01)
(52) U.S. Cl. .................... 416/241 R; 415/200
(58) Field of Classification Search ............. 416/241 R; 415/200
See application file for complete search history.

(56) References Cited

U.S. PATENT DOCUMENTS

| | | | |
|---|---|---|---|
| 3,024,175 A | 3/1962 | Cook | |
| 3,024,176 A | 3/1962 | Cook | |
| 3,024,177 A | 3/1962 | Cook | |
| RE25,630 E | 8/1964 | Cook | |
| 3,479,159 A | 11/1969 | Cook | |
| 3,842,921 A | 10/1974 | Dill | |
| 3,922,038 A | 11/1975 | Scales | |
| 4,055,706 A * | 10/1977 | Galmiche et al. | 428/652 |
| 4,824,482 A * | 4/1989 | Baldi | 148/279 |
| 4,957,421 A * | 9/1990 | Baldi | 419/8 |
| 5,182,078 A * | 1/1993 | Baldi | 414/9 |
| 5,213,907 A * | 5/1993 | Caballero | 428/678 |
| 5,314,608 A * | 5/1994 | Caballero | 205/238 |
| 5,431,804 A * | 7/1995 | Caballero | 205/621 |
| 5,573,604 A | 11/1996 | Gerdes | |
| 5,792,289 A | 8/1998 | Morton | |
| 6,458,218 B1 | 10/2002 | Savich | |
| 7,531,021 B2 * | 5/2009 | Woodfield et al. | 75/244 |

\* cited by examiner

*Primary Examiner* — Igor Kershteyn
(74) *Attorney, Agent, or Firm* — Schiff Hardin LLP

(57) ABSTRACT

Turbine blades, including airfoils, of aviation or industrial gas turbine engines are treated with boron to improve surface hardness and/or durability. Both stainless steel components and titanium components may be treated with boron. Elemental boron is diffused into the surface of the blade or other component, forming FeB and $Fe_2B$ in stainless steel components and titanium boride in titanium components. This treatment produces components with increased resistance to erosion caused by airborne particles and pollutants, extending the life of the components.

17 Claims, 2 Drawing Sheets

TREATMENT OF TURBINE BLADES TO INCREASE HARDNESS

BACKGROUND OF THE INVENTION

1. Technical Field

The disclosure of the present application relates generally to the treatment of turbine blades to increase their hardness and/or durability.

2. Background

The aviation and/or industrial gas turbine engine is comprised of a series of rotating and stationary airfoil components arranged in stages. These components are grouped in two areas of the engine: the compressor, or 'cold' section, and the turbine, or 'hot' section. Air, drawn into the forward cold section is compressed as it passes over the airfoils and is forced into the hot section in which fuel is injected and combustion occurs. As a result of that combustion, the hot expanding gas is forced over and through the rear turbine blades and vanes, which in turn, accelerates the rotation of the compressor blades to increase fuel combustion with a corresponding increase in thrust or available energy.

A substantial amount of the energy developed from the fuel combustion is dedicated to running the compressor section of the turbine. The excess energy from driving the compressor becomes either thrust to push the engine if attached to an airplane or rotational energy in ground based applications.

Over time, erosion caused by airborne particles and pollutants wears the airfoils of the turbine, resulting in gradual loss of cross-section and airfoil thickness. To compensate for cross-section loss and subsequent deterioration of the aerodynamics of the compressor blades, more fuel is consumed to maintain the required energy output.

A thin layer of hard wear-resistant coating can maintain efficiency for a longer period of time and result in considerable fuel cost savings over the life of the engine. Even a 1% increase in fuel efficiency represents significant fuel cost savings. For example, in terms of 2005 fuel consumption data, as much as $460,000,000 of fuel cost savings per year to all US carriers combined can be realized for each 1% increase in fuel efficiency (Air Transport Association Economics and Energy Bulletin, Jan. 18, 2007).

Treating metallic components with boron is one way to improve wear resistance; however, some boron treatments result in surfaces that are brittle and crack easily. One method developed to provide a surface resistant to cracking or deformation was disclosed in U.S. Pat. Nos. 3,842,921 and 3,922,038, which are incorporated herein by reference. These patents teach a method of carburizing surfaces prone to wear, boronizing the carburized surfaces, and then tempering the resulting boronized surfaces. In both patents, the treatment was applied to earth boring drill bits, prone to abrasive wear when in use. A number of other patents teach processes for creating a corrosion resistant coating of different types of metals, including U.S. Pat. Nos. 3,024,175; 3,024,176; 3,024,177; RE 25,630; and 3,479,159, all are incorporated herein by reference.

Boron has been previously used as an element of turbine blades, particularly at the tip of the blade, as taught by U.S. Pat. No. 5,573,604, which is incorporated herein by reference, where a portion of titanium turbine blades at the tip of the blade are alloyed with carbon, nitrogen, or boron, to increase the durability of that portion of the blade. Application of boron to the entire turbine blade will improve the hardness and/or durability over the entire body of the turbine blade, increasing the useful life of the component as a whole.

BRIEF SUMMARY

In one aspect of the present invention, boron is diffused into a turbine blade to improve the hardness and/or durability of the blade.

The boron may be applied through a variety of technologies, and to a variety of turbine blades, such as titanium blades, carbon steel blades, and stainless steel blades.

Other objects, features and advantages of the present invention will become apparent from the following detailed description. It should be understood, however, that the detailed description and the specific examples, while indicating embodiments of the invention, are given by way of illustration only, the invention being defined only by the claims following this detailed description.

DETAILED DESCRIPTION

Figure 1:
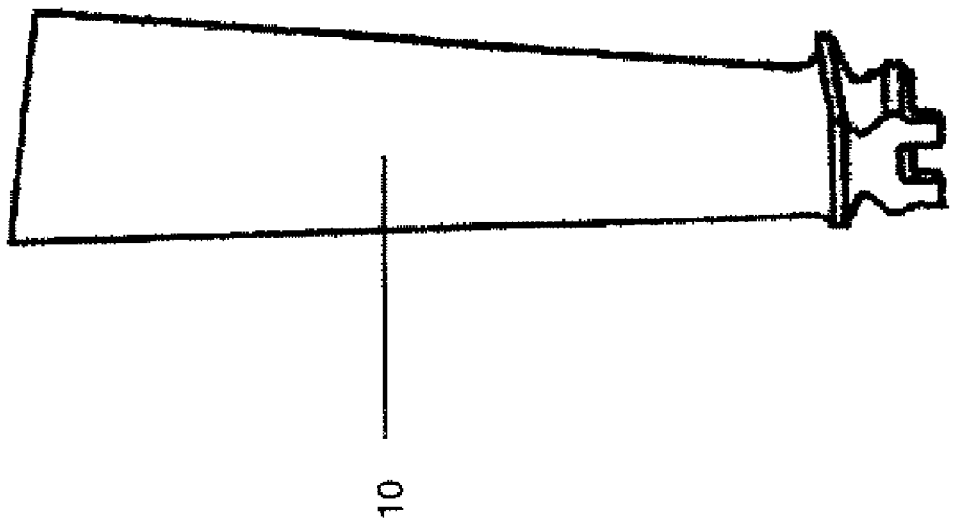
FIG. 1 shows a turbine blade having a surface treated with boron so as to improve the hardness and/or durability of the blade.

In one embodiment of the invention, a turbine blade 10, shown in FIG. 1 is constructed out of stainless steel or titanium. Both stainless steel blades and titanium blades may be treated by the same processes to achieve the improved hardness and durability. The turbine blades are those of the type used in the compressor section of a gas turbine engine. This type of engine, and turbine, are used in aviation and industrial applications, but are not limited to such uses.

Steel is composed of iron alloyed to carbon. Other elements, such as manganese, chromium, nickel, molybdenum, titanium, phosphorus, sulfur, selenium, nitrogen, silicon, cobalt, tantalum, and copper, can be added to the alloy to manipulate the characteristics of the resulting steel.

Any type of iron-based steel alloy can be treated with boron to increase hardness and/or durability, such as carbon steel, tool steel, and stainless steel. Martensitic steel is commonly used in the construction of turbine blades and is comprised of a variety of elements, such as those disclosed in U.S. Pat. No. 6,030,469. Martensitic steel typically contains chrome in the range of 12%-14% and carbon in the range of 0.08%-2% in addition to iron.

Turbine blades made of titanium may also be comprised of a variety of titanium alloys. Commercially pure titanium, with a few other elements may be used, but 6/4 titanium is used in one embodiment of the invention. 6/4 titanium is substantially composed of titanium, with 6% aluminum and 4% vanadium.

Figure 2:
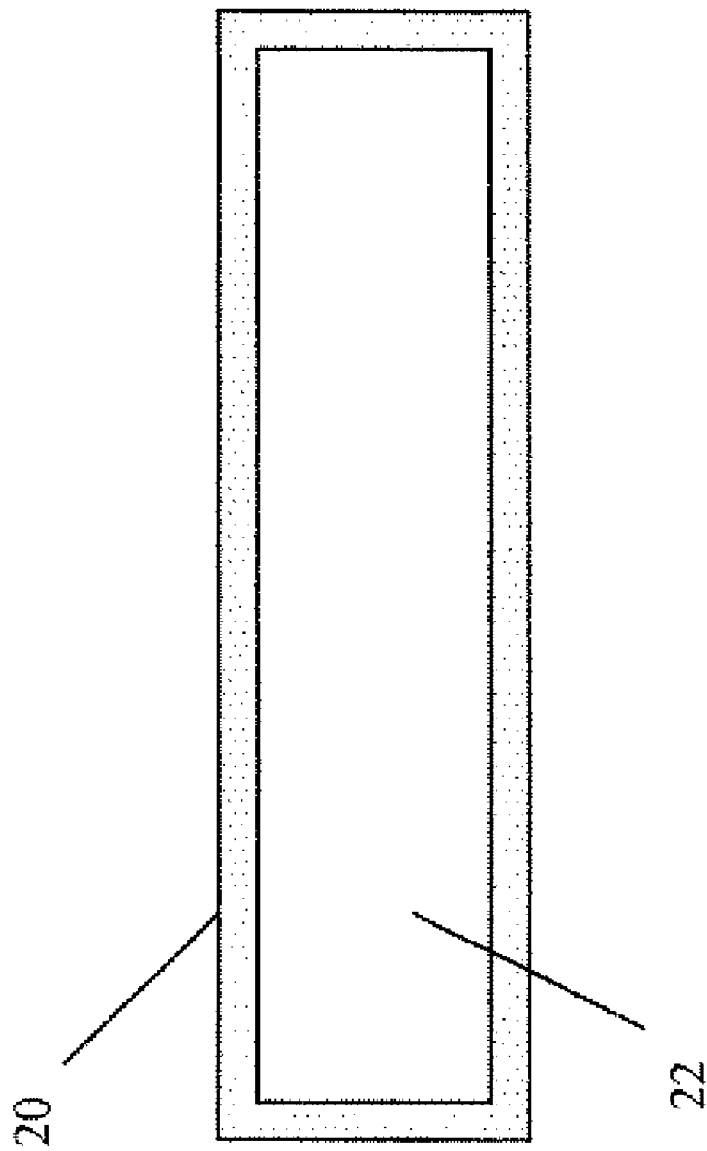
FIG. 2 is a cross-section of a portion of a component treated with boron to illustrate the result of boron treatment.

Treatment of turbine blades with boron results in the formation of a boron alloy layer 20 at the surface of the turbine blade, shown in FIG. 2. The boron alloy layer 20 does not extend through the whole cross section of the treated component, leaving a portion of the base metal 22 unaltered. With respect to stainless steel (or any steel) turbine blades, this alloy layer is substantially composed of FeB and $Fe_2B$. An alloy of iron and boron makes up about 90 to about 100% of the boron alloy layer after treatment of a stainless steel turbine blade. Small amounts of other elements present in the turbine blade comprise the remaining 0- about 10% of the alloy layer.

Treatment of a stainless steel turbine blade results in an boron alloy layer that is predominantly iron boride in part because of the composition of the stainless steel used in the blades and part because boron will not form an alloy with some of the other elements used in stainless steel.

While titanium turbine blades may also be comprised of various titanium alloys, such as the 6/4 titanium described above, the boron alloy layer created by treating a titanium turbine blade with boron is substantially composed of titanium boride. The vanadium and aluminum do not form alloys with the boron, so the resulting boron alloy layer has small amounts of other elements, including elemental boron, but is almost all titanium boride.

While treating metal components, such as turbine blades, with boron increases the hardness of the components, layers of pure boron applied on the surface of such components can be brittle. However, by diffusing boron into the base metal of the component, rather than layering it on top, hardness and durability can be increased without an accompanying brittleness. A desired thickness of the boron alloy layer on a titanium or stainless steel turbine blade is in the range of about 0.01 to about 0.001 inches thick. A thickness within this range will provide increased hardness for the turbine blades, while minimizing the brittle qualities of the boron.

In an embodiment of the invention, turbine blades are boron treated, then re-heat treated as necessary to return the turbine blades to the original component specifications. However, other methods of forming the boron alloy may be used including, but not limited to, ion implantation and/or plasma spray.

In an embodiment of the invention, the boron treatment takes place in an inert atmosphere with a temperature in the range of about 600° C. to about 1000° C. An electrical cell is formed with the turbine blade as the cathode and the source of boron as the anode. The turbine blade is placed into a fluoride salt electrolyte bath. Elemental boron is diffused into the turbine blade when current is applied to the electrical cell. The length of time of the process depends on the thickness of the boron alloy layer desired. For this application, the desired alloy layer depth is typically in the range of about 0.01 to about 0.001 inches. This process is disclosed in U.S. Pat. No. 3,024,176, which is incorporated herein by reference.

Another method of boron treatment uses a solid powders which is comprised in part of boron, and takes place at a temperature of about 600° C. to about 1000° C. in an inert atmosphere. The boron forms an alloy with the iron and/or titanium in the component being treated, creating a harder and more durable surface. One example of solid boron treatment employs a powder with 40% to 80% $B_4C$, 2% to 40% graphite, 1% to 4% potassium carbonate ($KHCO_3$), with up to 20% of impurities. The powder is in contact with the surfaces intended for boron treatment. At an operating temperature of approximately 900° C., a boron alloy layer of about 0.005 inch in depth will be formed after approximately 8 hours. Another example of solid boron treatment employs a nickel diboride powder in an inert atmosphere.

Liquid boron treatment occurs in a liquid salt bath in the presence of fluoride salts, again in the temperature range of about 600° C. to about 1000° C. Much like boron treating with boron in solid form, the thickness of the boron alloy layer is determined at least in part by the length of time that the process is allowed to continue. To develop a boron alloy layer of the preferred depth or thickness, the time of exposure of should be between 15 minutes and 3 hours when treating in the temperature range of 790° C. to 900° C.

Gas boron treatment takes place at temperatures between 500° C. and the melting point of the materials of construction of the component to be treated. The treatment takes place under an atmosphere of gaseous diborane ($B_2H_6$). The atmosphere of gaseous diborane will react with ferric materials in that temperature range, forming a boron alloy layer on the surface the base metal component. This process is disclosed in U.S. Pat. No. 2,494,267, which is incorporated herein by reference.

After any of the above treatments, the turbine blades may be treated with heat if necessary to bring the turbine blade into conformity with desired or original specifications. The heat treatment varies depending upon the individual specifications of the turbine blades.

The result of the process is increased hardness that may increase the working life of the turbine blade components by as much as four of five times. The boron alloy layer added to the blades is thin and does not substantially increase the dimensions of the turbine blades, but may result in a slight increase in the weight of the turbine blades. When a boron alloy layer is created at the surface of a stainless steel turbine blade, the hardness of the surface boron alloy layer is approximately 1800 to 2600 Knoop Hardness (HK). The hardness of the surface boron alloy layer on a titanium turbine blade can exceed 3600 HK. This results in a significant increase in hardness over the 300 to 400 HK of the base metals alone.

Treatment of the turbine blades can be accomplished via electrochemical methods, such as the gas, liquid, and solid boron treatments previously discussed, but other means may be used to apply boron to turbine blades composed of titanium and stainless steel alloys. Other possible means include ion implantation, plasma spray or other known manufacturing methods.

Although other modifications and changes may be suggested by those skilled in the art, it is the intention of the inventors to embody within the patent warranted hereon all changes and modifications as reasonably and properly come within the scope of their contribution to the art.

We claim:

1. A method of increasing the hardness of a turbine blade for the compressor section of a gas turbine engine comprising having a turbine blade comprised of a base metal, treating a surface of the base metal with boron, forming a boron alloy between the base metal and the boron to a predetermined depth of approximately 0.01-0.001 inch.

2. The method of claim 1, wherein the base metal comprises a steel alloy, and wherein the boron alloy comprises FeB and $Fe_2B$.

3. The method of claim 2, wherein the base metal comprises stainless steel.

4. The method of claim 2, wherein the iron boride comprises about 90% to 100% of the boron alloy to the predetermined depth.

5. The method of claim 1, wherein the base metal comprises titanium and wherein the boron alloy is comprised of titanium boride.

6. The method of claim 5, wherein the base metal comprises an alloy of titanium, aluminum, and vanadium.

7. The method of claim 6, wherein the alloy of titanium, aluminum, and vanadium comprises 6% aluminum and 4% vanadium.

8. The method of claim 7, wherein the titanium boride comprises about 75% to about 90% of the boron alloy to the predetermined depth.

9. The method of claim 1, wherein the boron alloy comprises an ion-implanted boron alloy.

10. The method of claim 1, wherein the boron alloy comprises a plasma-sprayed boron alloy.

11. The method of claim 1, wherein the boron alloy comprises an electrochemically diffused boron alloy.

12. A method of increasing the hardness of a turbine blade in an aviation gas turbine engine comprising having a turbine blade comprising a base metal, treating a surface of the base metal with boron, forming a boron alloy between the base metal and the boron to a predetermined depth of approximately 0.01-0.001 inch.

13. The method of claim 12, wherein the base metal comprises steel, and wherein the boron alloy is comprised of FeB and $Fe_2B$.

14. The method of claim 12, wherein the base metal comprises titanium and wherein the boron alloy is comprised of titanium boride.

15. A method of increasing the hardness of a turbine blade in an industrial gas turbine engine comprising having a turbine blade comprising a base metal, treating a surface of the base metal with boron, forming a boron alloy between the base metal and the boron to a predetermined depth of approximately 0.01-0.001 inch.

16. The method of claim 15, wherein the base metal comprises steel, and wherein the boron alloy is comprised of FeB and $Fe_2B$.

17. The method of claim 15, wherein the base metal comprises titanium and wherein the boron alloy is comprised of titanium boride.

* * * * *